United States Patent
Li et al.

(10) Patent No.: US 9,876,694 B2
(45) Date of Patent: Jan. 23, 2018

(54) APPARATUS AND METHOD FOR DETECTING ONLINE FAILURE AND SYSTEM

(71) Applicant: FUJITSU LIMITED, Kawasaki-shi, Kanagawa (JP)

(72) Inventors: Lei Li, Beijing (CN); Bo Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/208,157

(22) Filed: Jul. 12, 2016

(65) Prior Publication Data
US 2017/0019319 A1    Jan. 19, 2017

(30) Foreign Application Priority Data
Jul. 13, 2015 (CN) .......................... 2015 1 0408788

(51) Int. Cl.
*H04B 10/00* (2013.01)
*H04L 12/26* (2006.01)
(Continued)

(52) U.S. Cl.
CPC ..... *H04L 43/0817* (2013.01); *H04B 10/0795* (2013.01); *H04B 10/07953* (2013.01);
(Continued)

(58) Field of Classification Search
CPC . H04L 43/0817; H04L 43/062; H04L 43/087; H04Q 11/0066; H04Q 2011/0083;
(Continued)

(56) References Cited

U.S. PATENT DOCUMENTS 5,986,782 A * 11/1999 Alexander ........... H04B 10/077
398/26
6,215,565 B1 * 4/2001 Davis ..................... H04B 10/03
398/17
(Continued)

FOREIGN PATENT DOCUMENTS

JP  2004-240278  8/2004
JP  2012-22260   2/2012
(Continued)

OTHER PUBLICATIONS

Extended European Search Report dated Dec. 5, 2016 in corresponding European Patent Application No. 16177979.8.
(Continued)

*Primary Examiner* — Danny Leung
(74) *Attorney, Agent, or Firm* — Staas & Halsey LLP

(57) ABSTRACT

This application provides an apparatus and method for detecting online failure and a system. The apparatus includes: a reading unit configured to read signal to noise ratios of subcarriers from a receiver of a multicarrier optical communication system according to a predetermined monitoring time interval; a judging unit configured to judge whether there exist a first predetermined number of subcarriers of which the signal to noise ratios are less than a first threshold value; a detecting unit configured to monitor a change of distortion of the system when it is judged yes by the judging unit, and determine a cause of degradation of signal to noise ratios according to the change of distortion of the system; and a reporting unit configured to report degradation of signal to noise ratios and/or the cause of degradation of signal to noise ratios. With the apparatus and method and system provided by this application, changes of distortion of the system may be monitored on line, and the changes possibly posing a threat to normal operation of the
(Continued)

system may be early alerted, thereby making it possible to perform targeted adjustment in advance.

14 Claims, 10 Drawing Sheets

(51) Int. Cl.
  *H04B 10/079* (2013.01)
  *H04B 10/516* (2013.01)
  *H04Q 11/00* (2006.01)
(52) U.S. Cl.
  CPC ......... *H04B 10/516* (2013.01); *H04L 43/062* (2013.01); *H04L 43/087* (2013.01); *H04Q 11/0066* (2013.01); *H04Q 2011/0045* (2013.01); *H04Q 2011/0083* (2013.01)
(58) Field of Classification Search
  CPC .......... H04Q 2011/0045; H04B 10/516; H04B 10/0795; H04B 10/07953
  See application file for complete search history.

(56) References Cited

U.S. PATENT DOCUMENTS

| | | | | |
|---|---|---|---|---|
| 9,634,796 | B2* | 4/2017 | Tanaka | H04L 1/004 |
| 2007/0271369 | A1* | 11/2007 | Aydin | H04L 43/50 |
| | | | | 709/224 |
| 2008/0209032 | A1* | 8/2008 | Guo | H04L 29/06 |
| | | | | 709/224 |
| 2008/0225898 | A1 | 9/2008 | DeLew et al. | |
| 2008/0225989 | A1* | 9/2008 | An | G06F 7/68 |
| | | | | 375/326 |
| 2010/0092168 | A1* | 4/2010 | Li | H04B 10/0795 |
| | | | | 398/16 |
| 2012/0051742 | A1* | 3/2012 | Li | H04B 10/0795 |
| | | | | 398/38 |
| 2015/0086215 | A1* | 3/2015 | Chen | H04B 10/2507 |
| | | | | 398/136 |
| 2015/0103963 | A1* | 4/2015 | Chen | H04L 7/041 |
| | | | | 375/368 |
| 2015/0256288 | A1* | 9/2015 | Tanaka | H04L 1/004 |
| | | | | 714/776 |
| 2016/0285548 | A1* | 9/2016 | Nishihara | H04B 10/50 |
| 2017/0019319 | A1* | 1/2017 | Li | H04L 43/062 |

FOREIGN PATENT DOCUMENTS

| | | |
|---|---|---|
| WO | 2004/008666 A2 | 1/2004 |
| WO | 2004/008666 A3 | 1/2004 |
| WO | WO 2006/137123 A1 | 12/2006 |
| WO | 2015/087448 A1 | 6/2015 |

OTHER PUBLICATIONS

T. Takahara et al., "Discrete Multi-Tone for 100 Gb/s Optical Access Networks", *Optical Fiber Communications Conference and Exhibition (OFC)*, Fujitsu Labs. Ltd., 2014, pp. 1-3.

B. Liu et al., "Adaptive Channel Tracking and Bit-Power Reallocation for 100Gb/s Uncooled DMT Transceiver", *Optical Communication (ECOC)*, 2014, pp. 1-3.

P. Chow et al., "A Practical Discrete Multitone Transceiver Loading Algorithm for Data Transmission over Spectrally Shaped Channels", *IEEE Transactions on Communications*, Feb./Mar./Apr. 1995, vol. 43, No. 2/3/4.

* cited by examiner

APPARATUS AND METHOD FOR DETECTING ONLINE FAILURE AND SYSTEM

CROSS-REFERENCE TO RELATED APPLICATIONS

This application claims the priority benefit of Chinese Patent Application No. 201510408788.4, filed on Jul. 13, 2015 in the Chinese State Intellectual Property Office, the disclosure of which is incorporated herein in its entirety by reference.

BACKGROUND

1. Field

The present disclosure relates to a multicarrier optical communication system, and in particular to an apparatus and method for detecting online failure and a system.

2. Description of the Related Art

A multicarrier communication system is a communication system based on multicarrier modulation, which is widely used in wireless communications and wired access networks due to its advantages of high transmission rate, high spectrum efficiency and anti-multipath and frequency domain fading. In a short-haul optical communication application, a multicarrier communication system, especially a discrete multi-tone (DMT) system based on intensity modulation and direct detection, gains much attention in the industry due to its simple structure and high transmission rate, and is deemed as one of leading technologies in a short-haul optical communication application scenario, such as a next-generation data center, etc. (refer to Document 1).

However, different from conventional wireless communication and a wired access network, on the one hand, a rate of a DMT optical communication system is greater than or equal to 100 Gb/s, and at such a high rate, influence of a change of a system distortion on the performance of the system will be enlarged; and on the other hand, a typical application scenario, such as a data center, has a higher requirement on stability of the DMT optical communication system, which often requires the system to be able to ensure operating consecutively at a stable rate. While in the known art, the DMT system tracks only changes of signal to noise ratios (SNRs) of the subcarriers, simply attributes a cause of the changes of the SNRs to changes of system noises and crosstalk, and attempts to ensure continuity of traffics in a subcarrier bit swap manner (refer to Document 2).

It can be seen that, the known art does not solve two key problems of the DMT optical communication system. First, localization of the cause of the changes of the SNRs. As the communication rate of the DMT optical communication system is very high, slight changes of various distortion in the system, such as a clock jitter, etc., will bring changes of the SNRs, while such degradation of the SNRs is not brought by noises or crosstalk, hence, the continuity of the traffics cannot be ensured by the subcarrier bit swap. Second, assurance of a stable transmission rate. As facing to terminal users, the conventional wireless communication and wired access network do not require the stability of the transmission rate, and hence, the known art deals with the changes of the SNRs based on adjusting the transmission rate. However, the DMT optical communication system is used in such scenarios as interconnection of large-scale servers in the data center, and requires that the transmission rate of the system is stable, such as satisfying specifications of a 100 Gb/s Ethernet, etc.

Document 1: "Discrete Multi-Tone for 100 Gb/s Optical Access Networks", Takahara, T.; Fujitsu Labs. Ltd., Optical Fiber Communications Conference and Exhibition (OFC), 2014; and Document 2: "Adaptive Channel Tracking and Bit-Power Reallocation for 100 Gb/s Uncooled DMT Transceiver", Bo Liu; Weizhen Yan; Lei Li; Hao Chen; Zhenning Tao; Takahara, T.; Rasmussen, J. C.; Drenski, T. Optical Communication (ECOC), 2014.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the embodiments.

It was found by the inventors in the implementation of the present disclosure that if a change of performance of a system is early alerted and a possible cause of the change of the performance of the system is provided, problems of the system may be solved on the premise of ensuring a stable transmission rate.

In order to solve the problems put forward in the Background, this application provides an apparatus and method for detecting online failure and a system, which may monitor changes of various distortion of the system on line, and early alert changes possibly posing a threat to normal operations of the system.

According to a first aspect of the embodiments of the present disclosure, there is provided an apparatus for detecting online failure, including:

a reading unit configured to read signal to noise ratios of subcarriers from a receiver of a multicarrier optical communication system according to a predetermined monitoring time interval;

a judging unit configured to judge whether there exist a first predetermined number of subcarriers of which the signal to noise ratios are less than a first threshold value;

a detecting unit configured to monitor a change of distortion of the system when it is judged yes by the judging unit, and determine a cause of degradation of signal to noise ratios according to the change of distortion of the system; and a reporting unit configured to report degradation of signal to noise ratios and/or the cause of degradation of signal to noise ratios.

According to a second aspect of the embodiments of the present disclosure, there is provided a method for detecting online failure, including:

reading signal to noise ratios of subcarriers from a receiver of a multicarrier optical communication system according to a predetermined monitoring time interval;

judging whether there exist a first predetermined number of subcarriers of which the signal to noise ratios are less than a first threshold value;

monitoring a change of distortion of the system when it is judged yes by the judging unit, determining a cause of degradation of signal to noise ratios according to the change of distortion of the system, and reporting degradation of signal to noise ratios and/or the cause of degradation of signal to noise ratios.

According to a third aspect of the embodiments of the present disclosure, there is provided a multicarrier optical communication system, including an apparatus for detecting online failure, the apparatus for detecting online failure being configured to:

read signal to noise ratios of subcarriers from a receiver of the system according to a predetermined monitoring time interval;

judge whether there exist a first predetermined number of subcarriers of which the signal to noise ratios are less than a first threshold value;

monitor a change of distortion of the system when it is judged yes, and determine a cause of degradation of signal to noise ratios according to the change of distortion of the system; and report degradation of signal to noise ratios and/or the cause of degradation of signal to noise ratios.

An advantage of the embodiments of the present disclosure exists in that with the apparatus, method and system provided by this application, changes of various distortion of the system may be monitored on line, and the changes possibly posing a threat to normal operations of the system may be early alerted, thereby solving the problems put forward in the Background.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Figure 1:
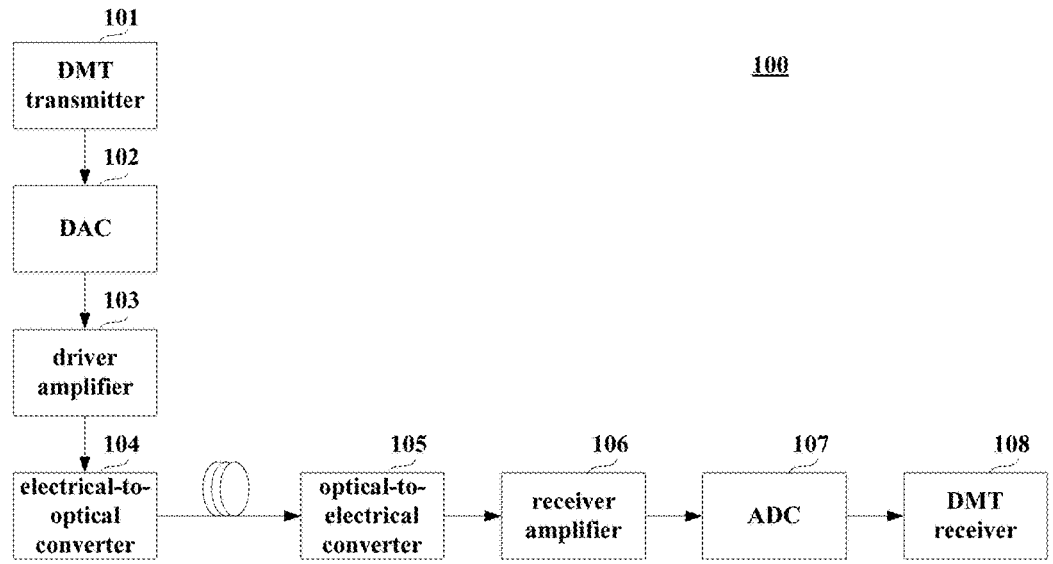
FIG. 1 is a schematic diagram of topology of a high-speed optical communication system based on the DMT (discrete-multi-tone) technology.

FIG. 1 is a schematic diagram of topology of a high-speed optical communication system 100 based on the DMT (discrete-multi-tone) technology. As shown in FIG. 1, the transmitting side of the optical communication system 100 includes: a DMT transmitter 101, a digital to analog converter (DAC) 102, a driver amplifier 103, and an electrical-to-optical converter 104, etc.; and the receiving side of the optical communication system includes: an optical-to-electrical converter 105, a receiver amplifier 106, an analog to digital converter (ADC) 107, and a DMT receiver 108, etc.

The embodiments of the present disclosure shall be described below with reference to the accompanying drawings and particular implementations taking the optical communication system 100 shown in FIG. 1 as an example. However, the embodiments of the present disclosure are not limited to the structure of the optical communication system 100 shown in FIG. 1, and the optical communication system 100 may further include other structures or functional modules.

Embodiment 1

This application provides an apparatus for detecting online failure, which may monitor real-time changes of various distortion of the DMT optical communication system on line, and early alert the changes of the distortion possibly affecting a stable transmission rate of the system according to a predetermined range (threshold) of change.

Figure 2:
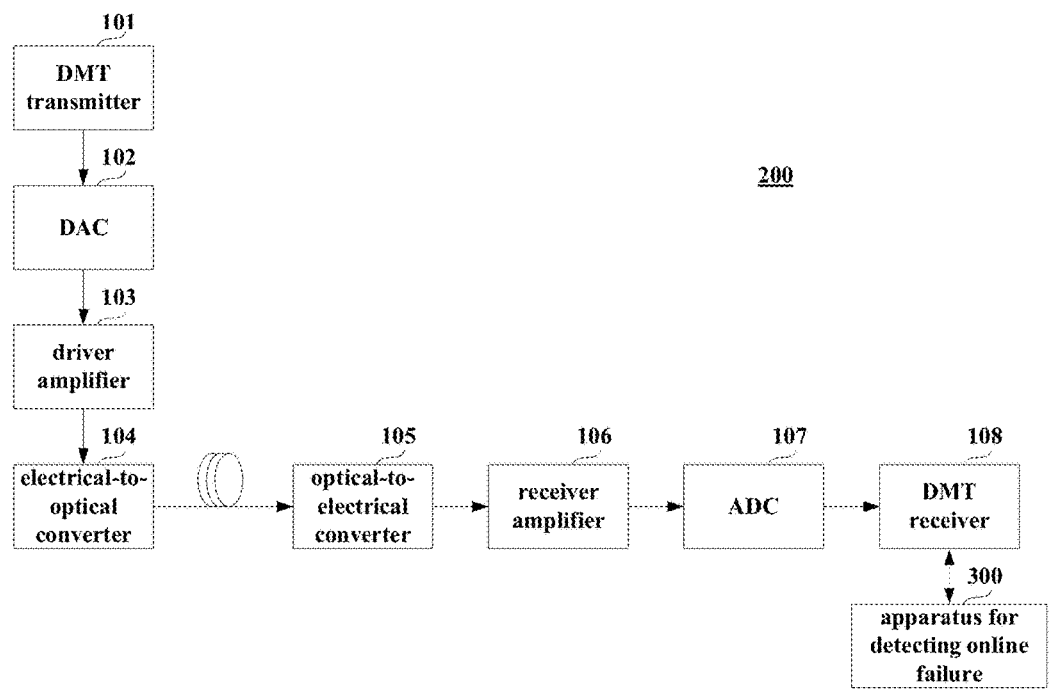
FIG. 2 is a schematic diagram of topology of the DMT optical communication system of an embodiment of the present disclosure.

In this embodiment, the apparatus for detecting online failure may be applicable to a DMT optical communication system. FIG. 2 is schematic diagram of a structure of the DMT optical communication system 200 including the apparatus for detecting online failure of this embodiment. As shown in FIG. 2, besides the DMT transmitter 101, the DAC 102, the driver amplifier 103, the electrical-to-optical converter 104, the optical-to-electrical converter 105, the receiver amplifier 106, the ADC 107 and the DMT receiver 108, the DMT optical communication system 200 further includes the apparatus 300 for detecting online failure of this embodiment, the apparatus 300 for detecting online failure being coupled to the DMT receiver 108 and configured to acquire various data from the DMT receiver 108, and details shall be described below. Furthermore, a set position of the apparatus 300 for detecting online failure of this embodiment shown in FIG. 2 is illustrative only, and in other embodiments, the apparatus 300 for detecting online failure may also be integrated into the DMT receiver 108 for being taken as a module of the DMT receiver 108.

Figure 3:
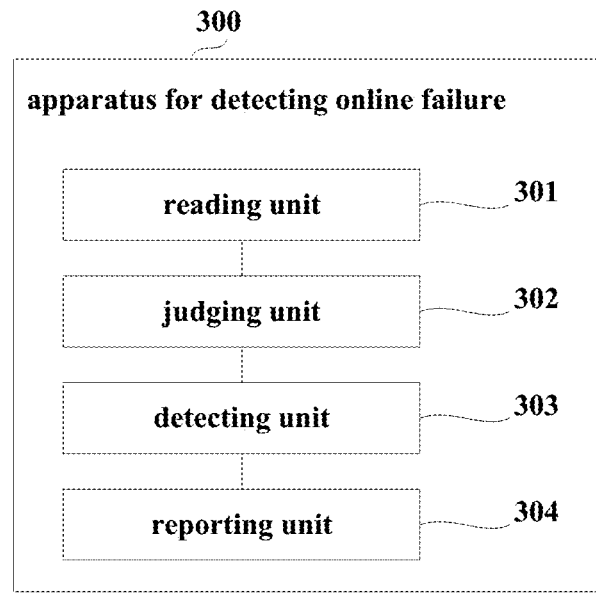
FIG. 3 is a schematic diagram of a structure of the apparatus for detecting online failure of an embodiment of the present disclosure.

FIG. 3 is a schematic diagram of a structure of the apparatus 300 for detecting online failure. As shown in FIG. 3, the apparatus 300 for detecting online failure includes a reading unit 301, a judging unit 302, a detecting unit 303 and a reporting unit 304.

In this embodiment, the reading unit 301 is configured to read signal to noise ratios of subcarriers from a receiver of a multicarrier optical communication system according to a predetermined monitoring time interval. In this embodiment, the reading unit 301 may read the SNRs of the subcarriers of the DMT system from the receiver according to the predetermined monitoring time interval, such as 1 second. In this embodiment, detection of the SNRs may be achieved by using a known art, such as the method in Document 2, and this embodiment is not limited thereto.

Figure 4:
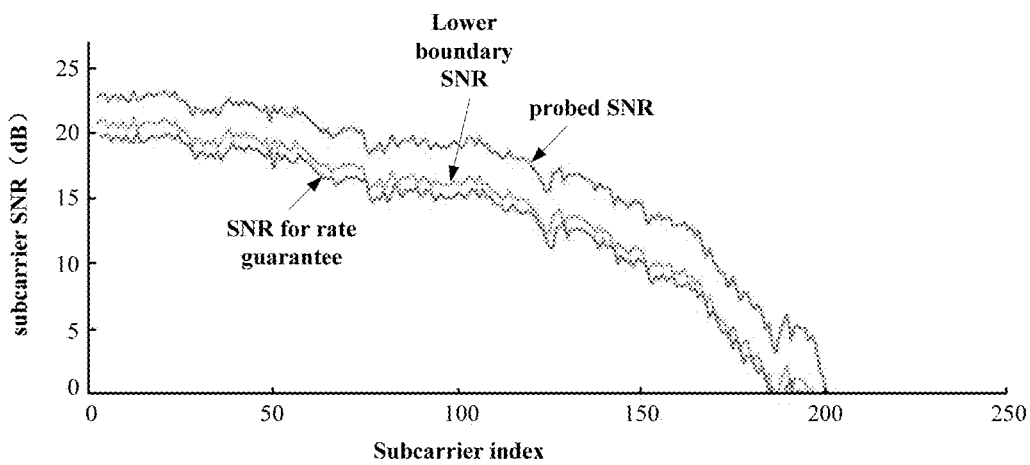
FIG. 4 is a schematic diagram of principles for setting a range of change of a signal to noise ratio.

In this embodiment, the judging unit 302 is configured to judge whether there exist a first predetermined number of subcarriers of which the signal to noise ratios are less than a first threshold value. In this embodiment, the judging unit 302 may detect the SNRs of the read subcarriers according to a predetermined range of change (referred to as a first threshold value in this embodiment). FIG. 4 is an example of the predetermined range of change of SNRs. As shown in FIG. 4, the probed SNR therein is an SNR measured at initial operation of the system, and an SNR for rate guarantee is an SNR needed for guaranteeing a stable transmission rate of the system.

In an implementation, the SNR needed for guaranteeing the stable transmission rate of the system may be obtained by linear and nonlinear characteristics simulation based on the probed SNR and devices. For example, in the simulation, noise initial values of subcarriers may be set according to the probed SNR, the transmission rate is kept unchanged, noises are increased gradually (the SNRs are decreased), until a bit error rate of the transmission exceeds a system threshold value, such as 1e-4, and the SNR at this moment is the SNR needed for guaranteeing the stable transmission rate of the system.

In another implementation, the SNR guaranteeing the transmission rate is obtained by performing margin adaptive water-filling calculation on the probed SNR, such as a method in Document 3 ("A Practical Discrete Multitone Transceiver Loading Algorithm for Data Transmission over Spectrally Shaped Channels", Peter S. Chow, John M. Cioffi, and John A. C. Bingham, IEEE TRANSACTIONS ON COMMUNICATIONS, VOL. 43, NO. 2/3/4, FEBRUARY/MARCH/APRIL 1995), in which the SNR guaranteeing the transmission rate is the probed SNR subtracted by power margin obtained through calculation.

In this embodiment, after the SNR needed for guaranteeing the stable transmission rate of the system is obtained, a lower boundary SNR is obtained by adding a margin set according to an expected early alert sensitivity, such as 1 dB, to the SNR.

In this embodiment, the judging unit 302 compares the read SNRs of the subcarriers with the set lower boundary SNR, when real-time monitoring values of SNRs of M ($M \geq 1$, the bigger the value of M, the lower the early alert sensitivity is) subcarriers are lower than the lower boundary SNR (less than the first threshold value), it shows that system distortion occurs, and in this embodiment, the detecting unit 303 is used to detect a cause of degradation of the SNRs; otherwise, it shows that the DMT optical communication system operates in a normal range, and the reading unit is used to proceed with a next time of reading.

In this embodiment, the detecting unit 303 is configured to monitor a change of distortion of the system when it is judged yes by the judging unit 302, so as to determine a cause of degradation of the signal to noise ratios.

In this embodiment, as a representative of the distortion of the system, a channel gain of the system and/or a DMT symbol synchronization error of the system and/or a clock of the system may be detected by the detecting unit 303, so as to determine whether the degradation of the signal to noise ratios is caused by the channel gain and/or the DMT symbol synchronization error of the system and/or the clock of the system. In this embodiment, these distortions of the system are illustrative only, and in particular implementation, the detecting unit 303 may further detect other distortion of the system possibly resulting in degradation of the signal to noise ratios, with its principles being identical to those of the above distortion of the system, which are omitted for description.

In this embodiment, after the cause of the degradation of signal to noise ratios is detected by the detecting unit 303, the reporting unit 304 is configured to report the event of the degradation of signal to noise ratios and/or the cause of the degradation of signal to noise ratios.

With the apparatus 300 for detecting online failure of the embodiment, the changes of the various distortion of the DMT optical communication system are real-time monitored while transmitting traffics, and a change posing a maximum threat to performance of the system is detected according to the predetermined range of change, thereby early alerting a change of the performance of the system, providing a possible cause of the change of the performance of the system, and making it possible to solve problems of the system on the premise of guaranteeing a stable transmission rate.

In this embodiment, the detecting unit 303 may determine an order of monitoring of the above different types of distortion of the system according to a descending order of probabilities of the cause of the degradation of the signal to noise ratios. For example, the channel gain is monitored first, then the DMT symbol synchronization error is monitored, and finally the clock of the system is monitored. What described above is illustrative only, and the detecting unit 303 may also determine the order of monitoring of the above different types of distortion of the system according to other policies. And the detecting unit 303 may determine whether to proceed with monitoring of subsequent other types of distortion of the system according to a monitoring result of a certain type of distortion of the system. For example, when it is monitored that the degradation of the signal to noise ratios is caused by a change of the channel gain, the detecting unit 303 may terminate the detection, that is, the DMT symbol synchronization error of the system and the clock of the system will not be monitored any longer.

The monitoring of the channel gain of the system, the monitoring of the DMT symbol synchronization error of the system and the monitoring of the clock of the system, by the detecting unit 303, shall be respectively described below with reference to three implementations. However, as described above, in particular implementation, the detecting unit 303 may carry out any one of the following three implementations or a combination thereof according to a specified order.

In an implementation of the detecting unit 303, the detecting unit 303 is configured to monitor the channel gain of the system when it is judged yes by the judging unit 302, and determine whether the cause of the degradation of the signal to noise ratios includes a change of the channel gain according to a monitoring result, that is, judging whether the above degradation of the signal to noise ratios is caused by degradation of the channel gain of the system.

Figure 5:
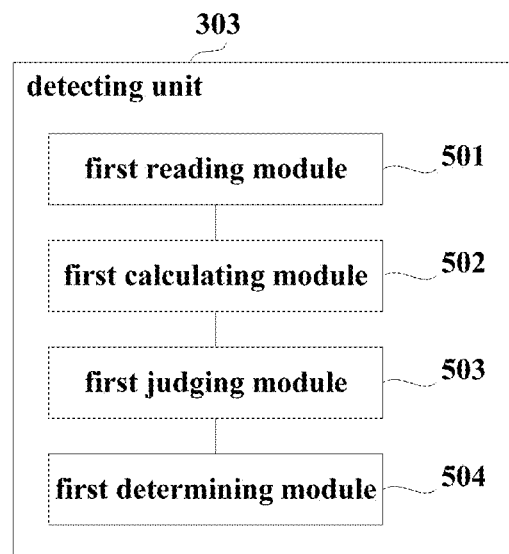
FIG. 5 is a schematic diagram of a structure of an implementation of a detecting unit of the apparatus for detecting online failure of the embodiment of the present disclosure.

FIG. 5 is a schematic diagram of a structure of the detecting unit 303 of this implementation. As shown in FIG. 5, in this implementation, the detecting unit 303 includes: a first reading module 501, a first calculating module 502, a first judging module 503 and a first determining module 504. The first reading module 501 is configured to read a coefficient of a channel equalizer from the receiver; the first calculating module 502 is configured to calculate channel gains of the subcarriers according to the coefficient of the channel equalizer; the first judging module 503 is configured to judge whether there exist a second predetermined number of subcarriers of which the channel gains are less than a second threshold value in the first predetermined number of subcarriers; and the first determining module 504 is configured to determine that the cause of degradation of signal to noise ratios includes a change of the channel gains when it is judged yes by the first judging module 503.

In the implementation shown in FIG. 5, first, the first reading module 501 reads the coefficient C of the channel equalizer from the DMT receiver, C being a 1×N determinant, N being the number of subcarriers of the DMT system, and C being expressed as:

$$C=[c_1 c_2 \ldots c_{N-1} c_N];$$

where, $c_i$ is a complex number denoting an equalization coefficient in an i-th subcarrier. The DMT receiver will real-time update these coefficients, so as to track changes of channels (refer to Document 2 for details), hence, these coefficients reflect the changes of the channels. The first calculating module 502 performs a modulo operation and an inverse operation on the read channel equalization coefficients, so as to obtain the channel gains $g_i$ in the subcarriers at a moment of monitoring, that is, $$G = [g_1 \; g_2 \; \ldots \; g_{N-1} \; g_N] = \left[ \frac{1}{|c_1|} \; \frac{1}{|c_2|} \; \ldots \; \frac{1}{|c_{N-1}|} \; \frac{1}{|c_N|} \right].$$

The first judging module 503 detects the channel gains on the subcarriers obtained by the first calculating module 502, so as to judge whether the degradation of the channel gains is a main cause of the degradation of the performance of the system. In an implementation of the first judging module 503, the first judging module 503 performs the above judgment based on a predetermined range of change of channel gains (referred to as a second threshold value in this embodiment).

Figure 6:
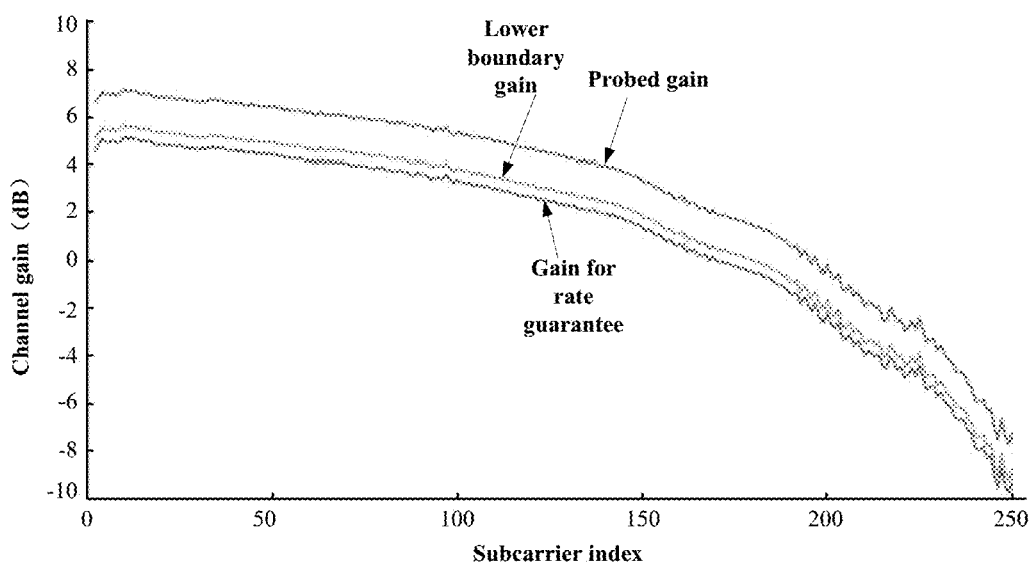
FIG. 6 is a schematic diagram of principles for setting a range of change of a channel gain.

FIG. 6 is an example of the range of change of channel gains. As shown in FIG. 6, a method for setting the range of change of channel gains is similar to the method for setting the range of change of channel SNRs shown in FIG. 4. The probed gain shown in FIG. 6 is a stored channel gain measured at initial operation of the system, and the gain for rate guarantee is a channel gain needed for guaranteeing the stable transmission rate of the system.

In an implementation, the channel gain needed for guaranteeing the stable transmission rate of the system may be obtained by linear and nonlinear characteristics simulation based on the probed gain and devices. For example, in the simulation, initial values of the channel gains of the subcarriers may be set according to the probed gain, the transmission rate is kept unchanged, the channel gains are lowered gradually, until a bit error rate of the transmission exceeds a system threshold value, such as 1e-4, and the channel gain at this moment is the channel gain needed for guaranteeing the transmission rate.

In another implementation, the channel gain guaranteeing the transmission rate is also obtained based on the calculation of margin adaptive water-filling. For example, the channel gain guaranteeing the transmission rate is the probed gain subtracted by power margin obtained through calculation.

In the implementation shown in FIG. 5, after the channel gain needed for guaranteeing the stable transmission rate of the system is obtained, a lower boundary gain is obtained by adding a margin set according to an expected early alert sensitivity, such as 0.5 dB, to the channel gain.

In the implementation shown in FIG. 5, if it is found by the first judging module 503 that channel gains of L (1≤L≤M) subcarriers (a second predetermined number of subcarriers) in M subcarriers (a first predetermined number of subcarriers) with degraded SNRs detected by the judging unit 202 are lower than the set lower boundary gain, the first determining module 504 may determine a current main threat to the DMT optical communication system is a change of the channel gains. And if it is not found by the first judging module 503 that the channel gains of the above second predetermined number of subcarriers are lower than the set lower boundary gain, the threat of the change of the channel gains is removed.

In the implementation shown in FIG. 5, after the detecting unit 303 (the first determining module 504) determines that the cause of the degradation of the SNRs includes the change of the channel gains, the reporting unit 304 may report the threat to a network administration system of an upper layer, and reported content includes but is not limited to the degradation of the SNRs detected in the judging unit 302, the real-time channel gains of the subcarriers calculated by the first calculating module 502 and the degradation of the channel gains detected in the first judging module 503.

In another implementation of the detecting unit 303, the detecting unit 303 is configured to monitor a discrete multi-tone (DMT) symbol synchronization error of the system when it is judged yes by the judging unit 302, and determine whether the cause of degradation of the signal to noise ratios includes the DMT symbol synchronization error according to a monitoring result, that is, judging whether the DMT symbol synchronization error of the system is within a permitted range of the system.

Figure 7:
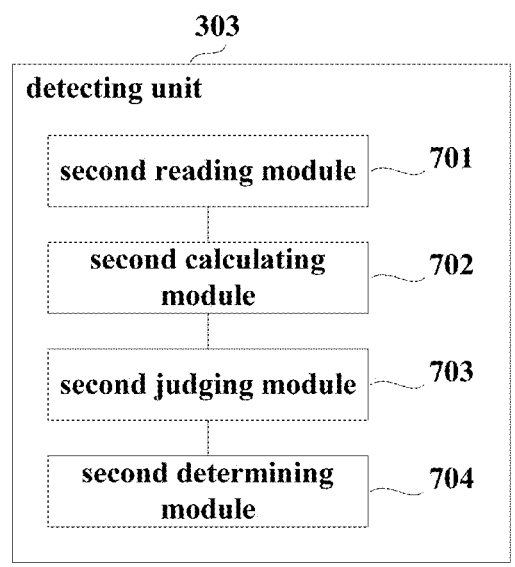
FIG. 7 is a schematic diagram of a structure of another implementation of the detecting unit of the apparatus for detecting online failure of the embodiment of the present disclosure.

FIG. 7 is a schematic diagram of a structure of the detecting unit 303 of this implementation. As shown in FIG. 7, in this implementation, the detecting unit 303 includes: a second reading module 701, a second calculating module 702, a second judging module 703 and a second determining module 704. The second reading module 701 is configured to read the coefficient of the channel equalizer from the receiver; the second calculating module 702 is configured to calculate equalization coefficient phases of the subcarriers according to the coefficient of the channel equalizer, calculate a linear change of the equalization coefficient phases according to the equalization coefficient phases of the subcarriers, and calculate a digital sampling number of the DMT symbol synchronization error according to the linear change of the equalization coefficient phases; the second judging module 703 is configured to judge whether the digital sampling number of the DMT symbol synchronization error is greater than a third threshold value; and the second determining module 704 is configured to determine that the cause of degradation of signal to noise ratios includes the DMT symbol synchronization error when it is judged yes by the second judging module 703.

Figure 8:
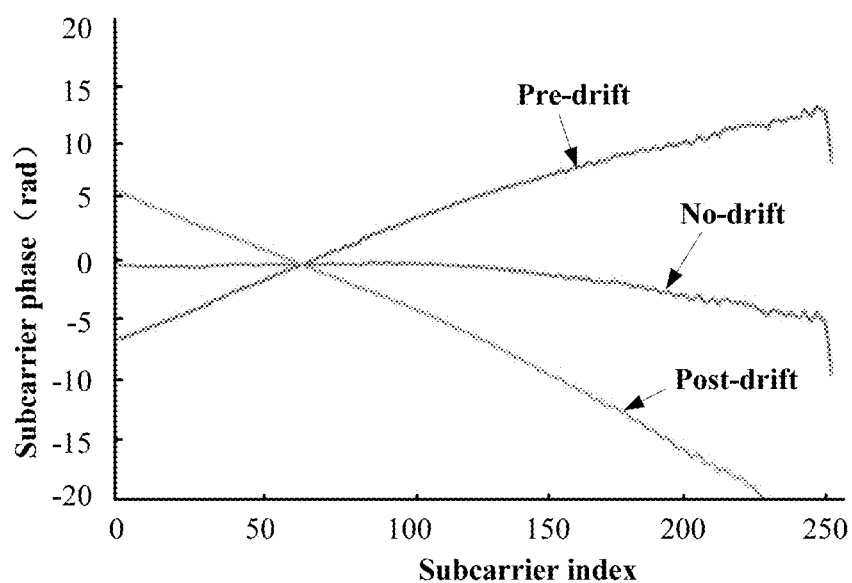
FIG. 8 is schematic diagrams of equalization coefficient phases and a DMT symbol synchronization error.

In the implementation shown in FIG. 7, the detecting unit 303 is based on the equalization coefficient phases of the subcarriers, in particular, the second calculating module 702 obtains a curve of a change of the equalization coefficients phase of the subcarriers along with frequency by angling the equalization coefficients ci of the subcarriers and performing an unswap operation on them (that is, if a change of an angle between neighboring subcarriers is greater than +/−2π, 2π is correspondingly added to or subtracted from the angle). As shown in FIG. 8, if there exists no DMT symbol synchronization error, the equalization coefficient phases are as shown by the no-drift curve in FIG. 8, and a slope at a low frequency in the curve is approximately zero. And when there exists the DMT symbol synchronization error, the equalization coefficient phases change linearly, as shown by the pre-drift curve and the post-drift curve in FIG. 8. In this implementation, the second calculating module 702 first obtains the equalization coefficient phases, and then calculates a slope of the linear change, so as to determine a size and direction of the current DMT symbol synchronization error of the system.

In particular, $$\Phi = [\varphi_1 \varphi_2 \ldots \varphi_{N-1} \varphi_N] = [\text{angle}(c_1) \text{angle}(c_2) \ldots \text{angle}(c_{N-1}) \text{angle}(c_N)];$$

where, $\varphi_i$ is an equalization coefficient phase of the i-th subcarrier. As a phase change of a channel itself at a high frequency (a relatively large i) is relatively large, the second calculating module 702 may select the phase at the middle or lower frequency to calculate a linear change of the equalization coefficient phases.

$$\Delta\varphi = \frac{1}{K}\sum_{i=1}^{K}(\varphi_{i+1} - \varphi_i);$$

where, K is an integer and K≤N/2. And the second calculating module 702 may directly calculate the number of digital samples of the DMT symbol synchronization error according to the linear change $\Delta\varphi$ of the equalization coefficient phases.

$$\Delta T = \frac{\Delta\varphi}{2\pi} \times \frac{f_{sample}}{f_{sc}};$$

where, $f_{sample}$ is a digital sampling rate of the DMT system, and $f_{sc}$ is a subcarrier spacing of the DMT system. The DMT symbol synchronization error tolerable to the DMT optical communication system is decided by a length of a cyclic prefix and a length of a cyclic postfix of a DMT symbol. The second judging module 703 checks the number of digital samples of the current synchronization error calculated by the second calculating module 702, and if $-(\text{postfix}-\alpha_1) < \Delta T < \text{prefix}-\alpha_2$, it shows that the synchronization error is within a tolerance of the system, and it does not pose a threat to the performance of the system; where, $\alpha_1$ and $\alpha_2$ are margin values set taking inter-symbol crosstalk of the system into account, which are often set to be 1 or 2. And if the number of digital samples of the synchronization error exceeds the above range, it shows that the synchronization error poses a main threat to the performance of the system.

In the implementation shown in FIG. 7, after the detecting unit 303 (the second determining module 704) determines that the cause of the degradation of the signal to noise ratios includes the DMT (discrete-multi-tone) symbol synchronization error, the reporting unit 304 may report the threat to the network administration system of the upper layer, and reported content includes but is not limited to the degradation of the SNRs detected in the judging unit 302, and the synchronization error detected in the second judging module 703.

In another implementation of the detecting unit 303, the detecting unit 303 is configured to monitor a clock jitter of the system when it is judged yes by the judging unit 302, and determine whether the cause of degradation of signal to noise ratios includes the clock jitter according to a monitoring result, that is, judging whether the clock of the system operates normally.

Figure 9:
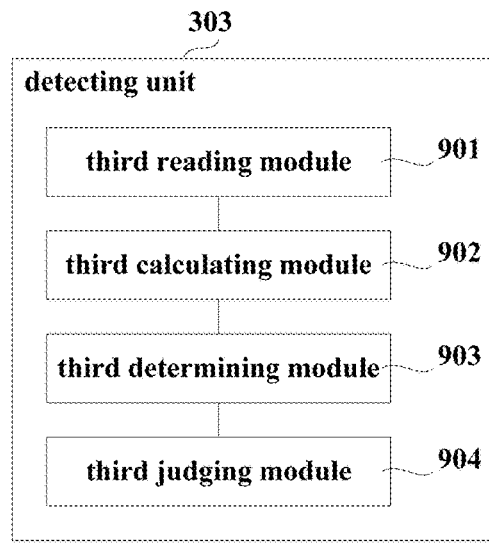
FIG. 9 is a schematic diagram of a structure of a further implementation of the detecting unit of the apparatus for detecting online failure of the embodiment of the present disclosure.

FIG. 9 is a schematic diagram of a structure of the detecting unit 303 of this implementation. As shown in FIG. 9, in this implementation, the detecting unit 303 includes: a third reading module 901, a third calculating module 902, a third determining module 903 and a third judging module 904. The third reading module 901 is configured to read demodulation data of multiple subcarriers from the receiver; the third calculating module 902 is configured to calculate phase noises on the multiple subcarriers according to the demodulation data of the multiple subcarriers, and calculate clock jitters of the multiple subcarriers according to the phase noises on the multiple subcarriers; the third determining module 903 is configured to determine the clock jitter of the system according to the clock jitters of the multiple subcarriers; and the third judging module 904 is configured to judge whether the clock jitter of the system is greater than a fourth threshold value. And the third determining module 903 is configured to determine that the cause of degradation of signal to noise ratios includes the clock jitter when it is judged yes by the third judging module 904.

In an implementation of the third determining module 903, the third determining module 903 is configured to, for subcarriers in each discrete multi-tone symbol, average the clock jitters of the subcarriers in the discrete multi-tone symbol, so as to obtain a clock jitter value on the discrete multi-tone symbol, and take an average square root value of clock jitter values on multiple discrete multi-tone symbols as the clock jitter of the system.

In the implementation shown in FIG. 9, for the DMT optical communication system, an operational frequency of a digital sampling clock of the system is very high, which is usually 50~90G sample/s, and once the operation of the clock is unstable, its influence on the performance of the system is mainly embodied in that relatively large phase noises are carried in received demodulation signals. The third calculating module 902 is mainly to detect the phase noises in the demodulation signals. A method of detection is to select subcarriers of modulation formats being BPSK and QPSK from subcarriers of different modulation formats, after a certain period of time, such as 100 ms, read demodulation data of the selected subcarriers from the DMT receiver, and calculate magnitude of the phase noises and corresponding clock jitters.

In an implementation, the calculation of the phase noises is to perform D-th power operation on the read demodulation signals to remove demodulation data (D=2 for the DPSK subcarriers, and D=4 for the QPSK subcarriers), angle the operation result and divide by D to obtain the phase noises on the subcarriers, and divide by the frequencies to which the subcarriers correspond to obtain the clock jitters detected on the subcarriers. As a rate of change of a clock jitter is far slower than a symbol rate of the DMT optical communication system, the clock jitters detected on the detected subcarriers in a DMT symbol may be averaged to remove the influence of the noises, so as to obtain accurate numeral values of the clock jitters on the DMT symbol. The above procedure is repeatedly performed on multiple DMT symbols, so as to obtain instantaneous values of clock jitters in the multiple DMT symbols, and root mean square values (RMS values) of these instantaneous values are taken, so as to obtain clock jitters reflected on the demodulation signals. A mathematical expression of the above procedure is as follows:

$$\varphi_{i,k} = \frac{1}{D}\text{angle}[(R_{i,k})^D];$$

where, $R_{i,k}$ is a demodulation signal received on a k-th subcarrier of an i-th DMT symbol. And the clock jitter detected on the subcarrier is:

$$\tau_{i,k} = \frac{\varphi_{i,k}}{2\pi k f_{sc}};$$

where, $f_{sc}$ is a subcarrier spacing of the DMT system, so $k*f_{sc}$ is the frequency where the subcarrier is. A detection result on the i-th DMT symbol is $\tau_i$ obtained by averaging the clock jitters obtained on the detected subcarriers in the symbol. And as a clock jitter is a type of colored noise, statistic is needed on multiple DMT symbols to obtain an RMS value, that is, $$\tau_{RMS} = \sqrt{\frac{\sum_{i=1}^{J}(\tau_i)^2}{J}};$$

where, J is a statistical format, and usually J>100. After the third determining module 903 obtains the clock jitters on the demodulation signals, the third judging module 904 compares the clock jitters with a clock jitter tolerable to the system in the normal operation, the clock jitter tolerable to the system usually being indicated by a system index, a general range of which being 0.2 ps-0.3 ps. If a clock jitter obtained by detection is greater than the range (a fourth threshold value), it shows that a main threat to the system is instability of the clock; and if a clock jitter obtained by detection is less than the tolerable range, it shows that the clock of the system operates normally.

In the implementation shown in FIG. 9, after the detecting unit 303 (the third determining module 903) determines that the cause of degradation of signal to noise ratios includes the clock jitter, the reporting unit 304 may report the threat to the network administration system of the upper layer, and reported content includes but is not limited to the degradation of the SNRs detected in the judging unit 302 and the clock jitters detected on the demodulation signals detected in the third determining module 903.

In this embodiment, if the above threats of various distortion of the system are excluded, the degradation of the performance of the system may possibly be caused by changes of noises and crosstalk of the system only, and the reporting unit 304 reports the threats of the noises and crosstalk of the system to the network administration system of the upper layer, and reported content includes but is not limited to the degradation of the SNRs detected in the judging unit 302, and the channel gains, synchronization errors and the clock jitters on the demodulation signals respectively monitored in the first judging module 503, the second judging module 703 and the third determining module 903.

The apparatus for detecting online failure of this embodiment sets ranges of changes of various distortion according to the premise that the transmission rate of the system being stable, performs real-time online monitoring by using the transmission data and system parameters, and monitors the changes of various distortion without breaking the traffic transmission or adding extra training sequences; and detects a change of distortion posing a maximum threat to the performance of the system according to the predetermined ranges of changes of various distortion, and puts forward early warning, thereby making targeted pre-adjustment possible.

Embodiment 2

This application further provides a method for detecting online failure. As principles of the method for solving problems are similar to that of the apparatus of Embodiment 1, the implementation of the apparatus of Embodiment 1 may be referred to for the implementation of the method, with identical contents being not going to be described herein any further.

Figure 10:
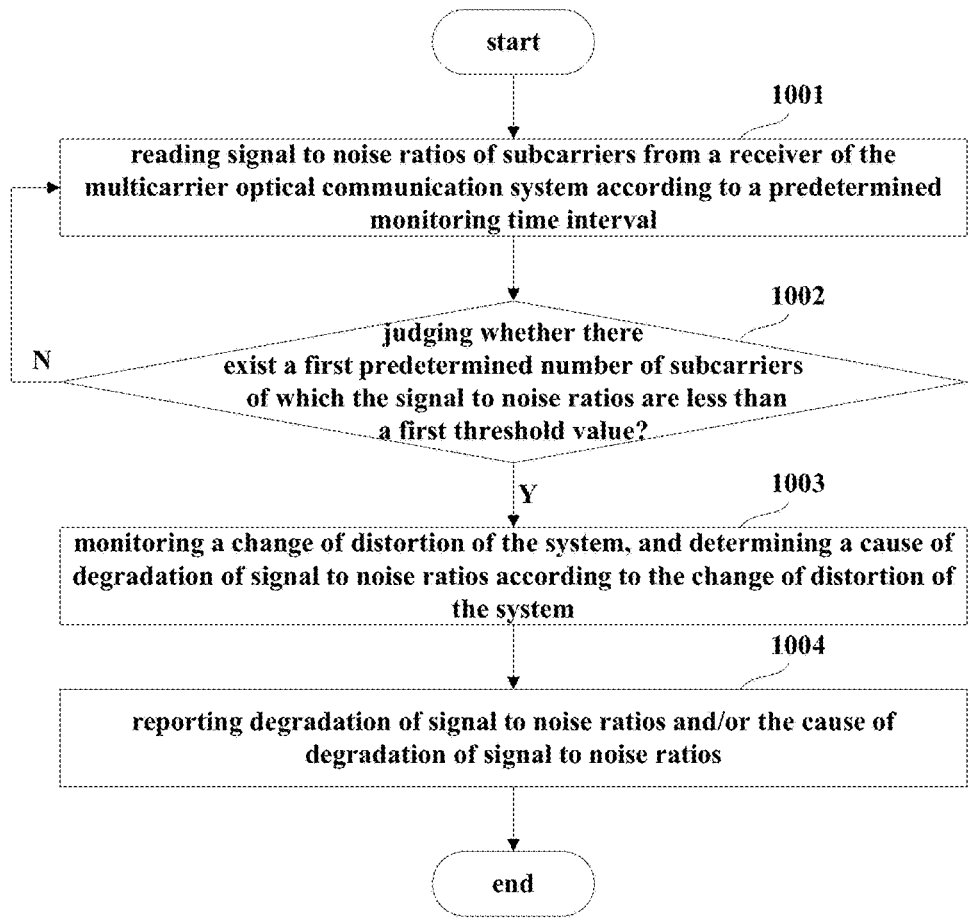
FIG. 10 is a flowchart of the method for detecting online failure of an embodiment of the present disclosure.

FIG. 10 is a flowchart of the method for detecting online failure of this embodiment, the method being applicable to a multicarrier optical communication system. Referring to FIG. 10, the method includes:

step 1001: reading signal to noise ratios of subcarriers from a receiver of the multicarrier optical communication system according to a predetermined monitoring time interval;

step 1002: judging whether there exist a first predetermined number of subcarriers of which the signal to noise ratios are less than a first threshold value; executing step 1003 if it is judged yes; otherwise, turning back to step 1001;

step 1003: monitoring a change of distortion of the system, and determining a cause of degradation of signal to noise ratios according to the change of distortion of the system; and step 1004: reporting degradation of signal to noise ratios and/or the cause of degradation of signal to noise ratios.

Figure 11:
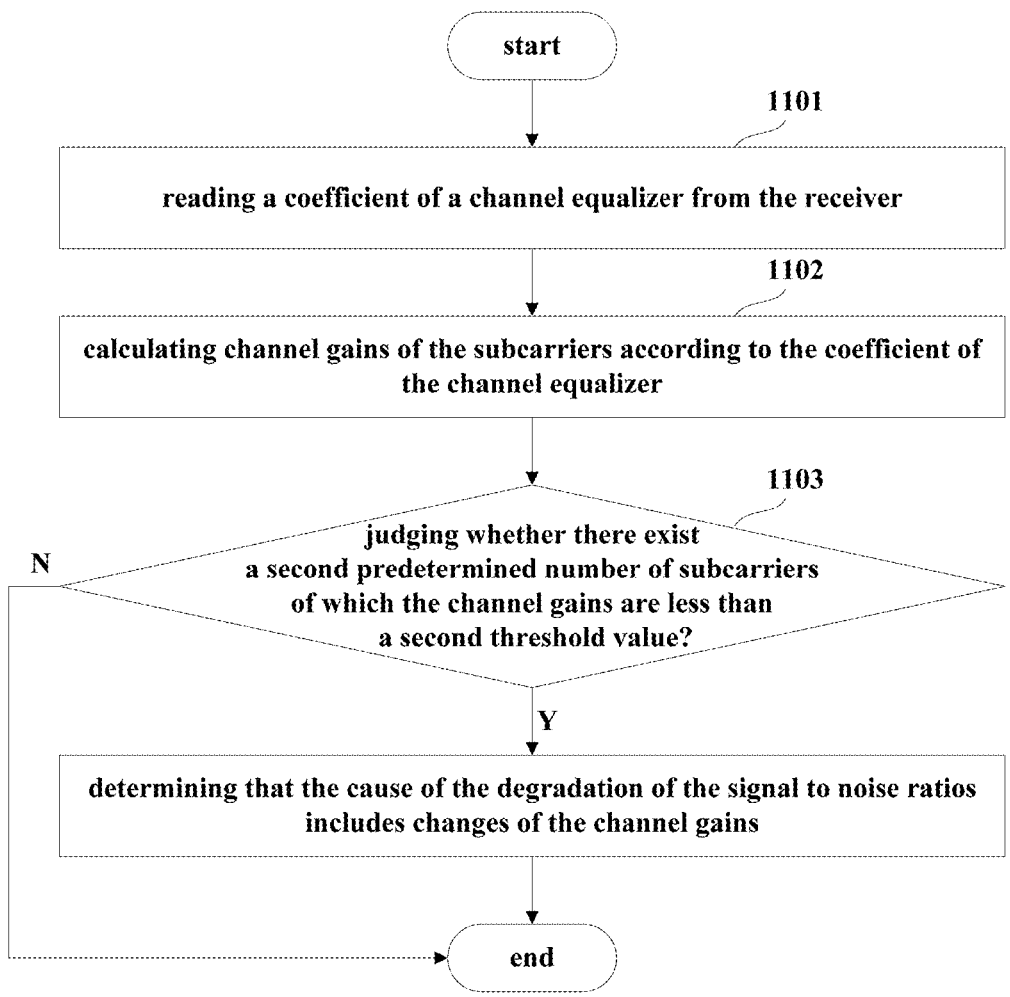
FIG. 11 is a flowchart of an implementation of step 103 of the method shown in FIG. 10.

In an implementation of step 1003, the monitoring a change of distortion of the system includes monitoring channel gains of the system, and the determining a cause of degradation of signal to noise ratios according to the change of distortion of the system may be carried out by a method shown in FIG. 11. Referring to FIG. 11, the method includes:

step 1101: reading a coefficient of a channel equalizer from the receiver;

step 1102: calculating channel gains of the subcarriers according to the coefficient of the channel equalizer; and step 1103: judging whether there exist a second predetermined number of subcarriers of which the channel gains are less than a second threshold value in the first predetermined number of subcarriers; determining that the cause of the degradation of the signal to noise ratios includes changes of the channel gains if it is judged yes; otherwise, determining that the cause of the degradation of the signal to noise ratios does not include the changes of the channel gains.

Figure 12:
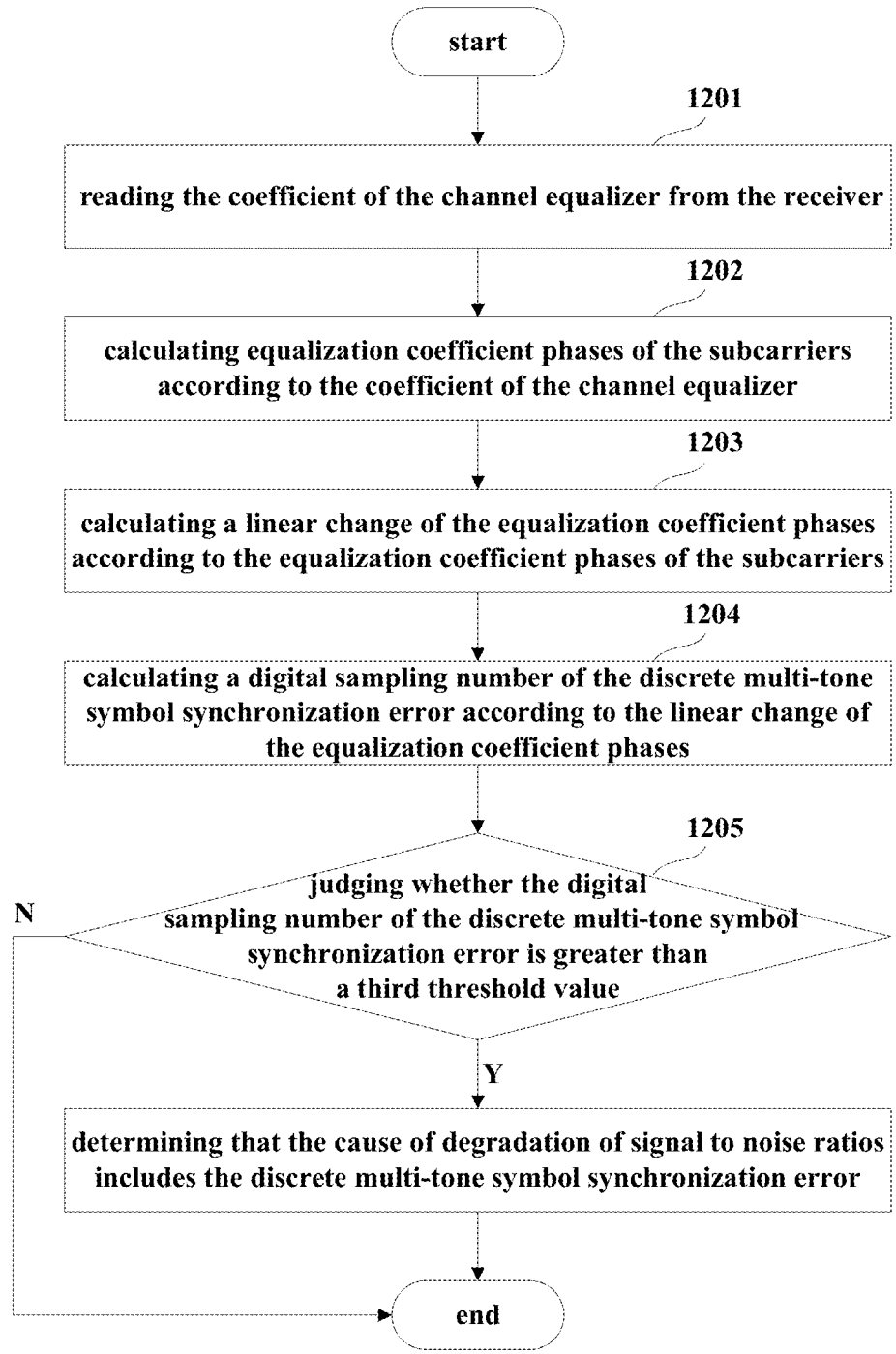
FIG. 12 is a flowchart of another implementation of step 103 of the method shown in FIG. 10.

In another implementation of step 1003, the monitoring a change of distortion of the system includes monitoring a discrete multi-tone symbol synchronization error of the system, and the determining a cause of degradation of signal to noise ratios according to the change of distortion of the system may be carried out by a method shown in FIG. 12. Referring to FIG. 12, the method includes:

step 1201: reading the coefficient of the channel equalizer from the receiver;

step 1202: calculating equalization coefficient phases of the subcarriers according to the coefficient of the channel equalizer;

step 1203: calculating a linear change of the equalization coefficient phases according to the equalization coefficient phases of the subcarriers;

step 1204: calculating a digital sampling number of the discrete multi-tone symbol synchronization error according to the linear change of the equalization coefficient phases; and step 1205: judging whether the digital sampling number of the discrete multi-tone symbol synchronization error is greater than a third threshold value; and determining that the cause of degradation of signal to noise ratios includes the discrete multi-tone symbol synchronization error when it is judged yes; otherwise, determining that the cause of the degradation of the signal to noise ratios does not include the discrete multi-tone symbol synchronization error.

Figure 13:
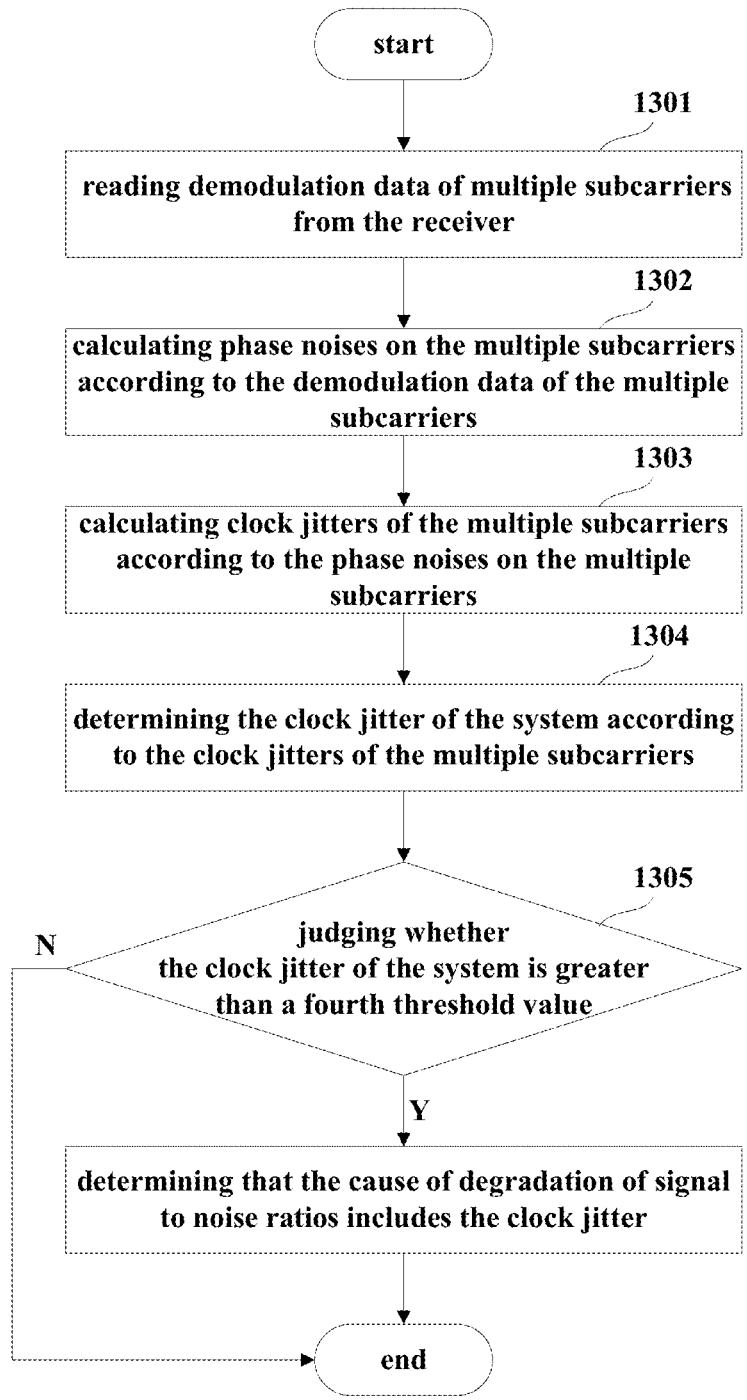
FIG. 13 is a flowchart of a further implementation of step 103 of the method shown in FIG. 10.

In a further implementation of step 1003, the monitoring a change of distortion of the system includes monitoring a clock jitter of the system, and the determining a cause of degradation of signal to noise ratios according to the change of distortion of the system may be carried out by a method shown in FIG. 13. Referring to FIG. 13, the method includes:

step 1301: reading demodulation data of multiple subcarriers from the receiver;

step 1302: calculating phase noises on the multiple subcarriers according to the demodulation data of the multiple subcarriers;

step 1303: calculating clock jitters of the multiple subcarriers according to the phase noises on the multiple subcarriers;

step 1304: determining the clock jitter of the system according to the clock jitters of the multiple subcarriers; where, for subcarriers in each discrete multi-tone symbol, the clock jitters of the subcarriers in the discrete multi-tone symbol may be averaged, so as to obtain a clock jitter value on the discrete multi-tone symbol; and then an average square root value of clock jitter values on multiple discrete multi-tone symbols is taken to obtain the clock jitter of the system;

step 1305: judging whether the clock jitter of the system is greater than a fourth threshold value; and determining that the cause of degradation of signal to noise ratios includes the clock jitter if it is judged yes; otherwise, determining that the cause of the degradation of the signal to noise ratios does not include the clock jitter.

In this embodiment, if the cause of degradation of signal to noise ratios includes the change of the channel gains, the degradation of signal to noise ratios and/or the channel gains and/or the degradation of the channel gains may be reported in step 1004; if the cause of degradation of signal to noise ratios includes the discrete multi-tone symbol synchronization error, the degradation of signal to noise ratios and/or the synchronization error may be reported in step 1004; if the cause of degradation of signal to noise ratios includes the clock jitter, the degradation of signal to noise ratios and/or the clock jitter of the system may be reported in step 1004; and if the cause of degradation of signal to noise ratios does not include the change of the channel gains, the discrete multi-tone symbol synchronization error and the clock jitter, the noises and crosstalk of the system may be reported in step 1004.

Figure 14:
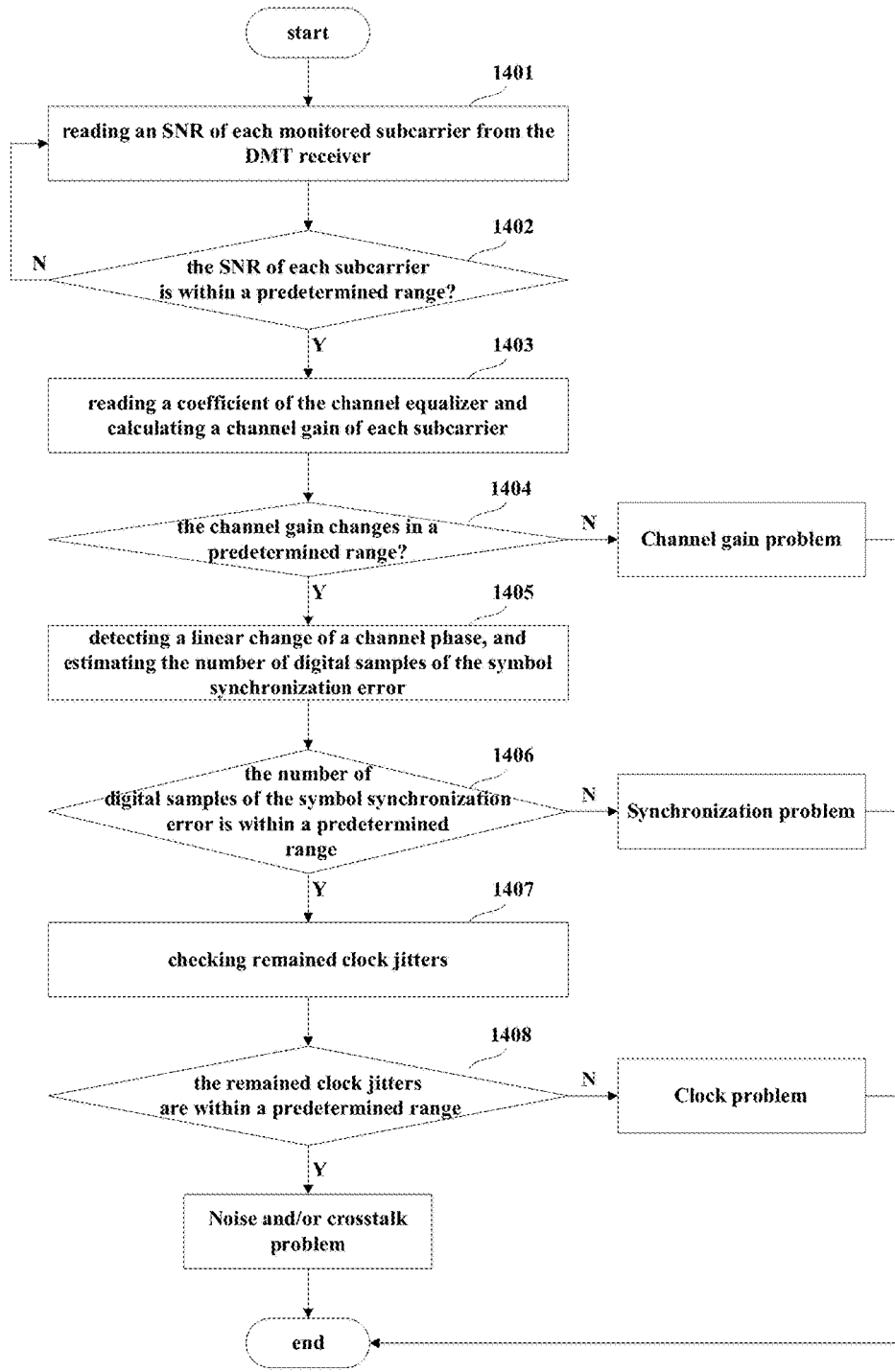
FIG. 14 is an overall flowchart of an implementation of the method for detecting online failure of the embodiment of the present disclosure.

FIG. 14 is an overall flowchart of an implementation of the method for detecting online failure according to the embodiment of the present disclosure. In this implementation, it is taken as an example that the channel gains are monitored first, then the DMT symbol synchronization error is monitored, and finally the clock jitters are monitored. However, as described above, this embodiment is not limited to the above monitored contents and order.

Referring to FIG. 14, the method includes:

step 1401: reading an SNR of each monitored subcarrier from the DMT receiver;

step 1402: judging whether the SNR of each subcarrier is within a predetermined range; and executing step 1403 if it is judged yes; otherwise, turning back to step 1401;

step 1403: reading a coefficient of the channel equalizer and calculating a channel gain of each subcarrier;

step 1404: judging whether the channel gain of each subcarrier changes in a predetermined range; and executing step 1405 if it is judged yes; otherwise, determining that the degradation of the SNR is a problem of a channel gain;

step 1405: detecting a linear change of a channel phase, and estimating the number of digital samples of the symbol synchronization error;

step 1406: judging whether the number of digital samples of the symbol synchronization error is within a predetermined range; and executing step 1407 if it is judged yes; otherwise, determining that the degradation of the SNR is a problem of synchronization;

step 1407: checking remained clock jitters; and step 1408: judging whether the remained clock jitters are within a predetermined range; and determining that the degradation of the SNR is a problem of noise and/or crosstalk if it is judged yes; otherwise, determining that the degradation of the SNR is a problem of clock.

The implementation shown in FIG. 14 is illustrative only, and in particular implementation, monitoring of other distortion of the system may be added or monitoring of certain distortion of the system may be subtracted according to an actual situation, and an order of monitoring the distortion of the system is not limited to the order shown in FIG. 14.

With the method of this embodiment, the changes of the distortion of the system may be monitored on line and the changes possibly posing a threat to the normal operation of the system may be early alerted, thereby making it possible to perform targeted adjustment in advance.

Embodiment 3

An embodiment of the present disclosure further provides a computer system, including the apparatus 300 for detecting online failure described in Embodiment 1. As the apparatus 300 for detecting online failure has been described in detail in Embodiment 1, its contents are incorporated herein, which shall not be described herein any further.

Figure 15:
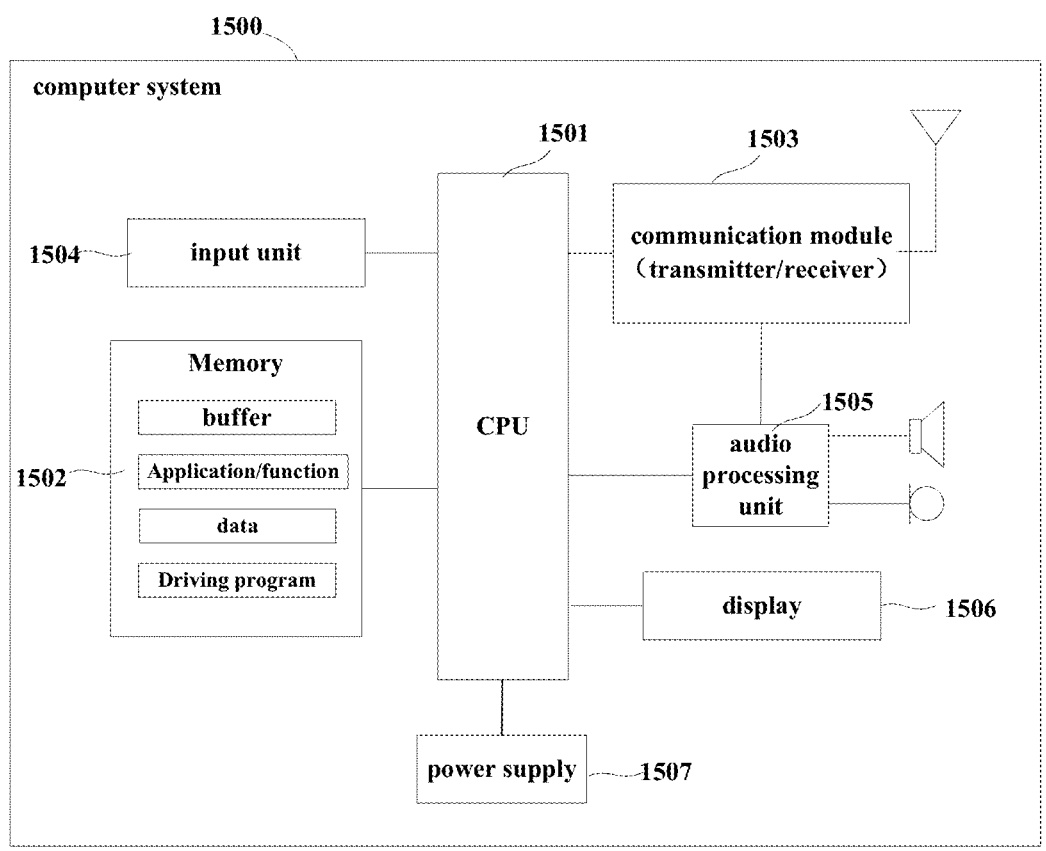
FIG. 15 is a schematic diagram of a structure of a computer system of an embodiment of the present disclosure.

FIG. 15 is a schematic diagram of a structure of a computer system of an embodiment of the present disclosure. As shown in FIG. 15, the computer system 1500 may include a central processing unit (CPU) 1501 and a memory 1502, the memory 1502 being coupled to the central processing unit 1501. It should be noted that this figure is illustrative only, and other types of structures may also be used, so as to supplement or replace this structure and achieve telecommunications function or other functions.

In an implementation, the function of the apparatus 300 for detecting online failure described in Embodiment 1 may be integrated into the central processing unit 1501.

In another implementation, the apparatus 300 for detecting online failure described in Embodiment 1 and the central processing unit 1501 may be configured separately. For example, the apparatus 300 for detecting online failure may be configured as a chip connected to the central processing unit 1501, with its functions being realized under control of the central processing unit 1501.

As shown in FIG. 15, the computer system 1500 may further include a communication module 1503, an input unit 1504, an audio processing unit 1505, a display 1506, and a power supply 1507. It should be noted that the computer system 1500 does not necessarily include all the parts shown in FIG. 15. Furthermore, the computer system 1500 may include other parts than those shown in FIG. 15, and the prior art may be referred to.

As shown in FIG. 15, the central processing unit 1501 is sometimes referred to as a controller or control, and may include a microprocessor or other processor devices and/or logic devices. The central processing unit 1501 receives input and controls operations of every components of the computer system 1500.

In this embodiment, the memory 1502 may be, for example, one or more of a buffer memory, a flash memory, a hard drive, a mobile medium, a volatile memory, a nonvolatile memory, or other suitable devices. The memory 1502 may store predefined or preconfigured information, and may further store programs executing related information. And the central processing unit 1501 may execute the programs stored in the memory 1502, so as to realize information storage or processing, etc. Functions of other parts are similar to those of the prior art, which shall not be described herein any further. The parts of the computer system 1500 may be realized by specific hardware, firmware, software, or any combination thereof, without departing from the scope of the present disclosure.

With the computer system 1500 of this embodiment, the changes of the distortion of the DMT optical communication system may be monitored on line and the changes possibly posing a threat to the normal operation of the DMT optical communication system may be early alerted, thereby making it possible to perform targeted adjustment in advance.

Embodiment 4

An embodiment of the present disclosure further provides a DMT (discrete-multi-tone) optical communication system. FIG. 2 is a schematic diagram of a structure of the system. As shown in FIG. 2, the system includes: a DMT transmitter 101, a DAC 102, a driver amplifier 103, an electrical-to-optical converter 104, an optical-to-electrical converter 105, a receiver amplifier 106, an ADC 107, a DMT receiver 108, and an apparatus 300 for detecting online failure.

In this embodiment, the prior art may be referred to for functions and structures of the DMT transmitter 101, DAC 102, driver amplifier 103, electrical-to-optical converter 104, optical-to-electrical converter 105, receiver amplifier 106, ADC 107 and DMT receiver 108, which are omitted for description.

In this embodiment, the apparatus 300 for detecting online failure is configured to:

read signal to noise ratios of subcarriers from a receiver of the system according to a predetermined monitoring time interval;

judge whether there exist a first predetermined number of subcarriers of which the signal to noise ratios are less than a first threshold value;

monitor a change of distortion of the system when it is judged yes, and determine a cause of degradation of signal to noise ratios according to the change of distortion of the system; and report degradation of signal to noise ratios and/or the cause of degradation of signal to noise ratios.

In this embodiment, the apparatus 300 for detecting online failure may be realized by the apparatus 300 for detecting online failure described in Embodiment 1, the contents of which being incorporated herein, and being not going to be described herein any further.

With the apparatus 300 for detecting online failure of this embodiment, the changes of the distortion of the DMT optical communication system may be monitored on line and the changes possibly posing a threat to the normal operation of the DMT optical communication system may be early alerted, thereby making it possible to perform targeted adjustment in advance.

An embodiment of the present disclosure further provides a computer-readable program, where when the program is executed in a receiver, the program enables the receiver to carry out the method as described in Embodiment 2.

An embodiment of the present disclosure provides a storage medium in which a computer-readable program is stored, where the computer-readable program enables a receiver to carry out the method as described in Embodiment 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory computer readable storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

For the implementation of the present disclosure containing the above embodiments, following supplements are further disclosed.

Supplement 1. An apparatus for detecting online failure, comprising:
a reading unit configured to read signal to noise ratios of subcarriers from a receiver of a multicarrier optical communication system according to a predetermined monitoring time interval;
a judging unit configured to judge whether there exist a first predetermined number of subcarriers of which the signal to noise ratios are less than a first threshold value;
a detecting unit configured to monitor a change of distortion of the system when it is judged yes by the judging unit, and determine a cause of degradation of signal to noise ratios according to the change of distortion of the system; and
a reporting unit configured to report degradation of signal to noise ratios and/or the cause of degradation of signal to noise ratios.

Supplement 2. The apparatus according to supplement 1, wherein the detecting unit is configured to monitor channel gains of the system when it is judged yes by the judging unit, and determine whether the cause of degradation of signal to noise ratios comprises a change of the channel gains according to a monitoring result.

Supplement 3. The apparatus according to supplement 2, wherein the detecting unit comprises:
a first reading module configured to read a coefficient of a channel equalizer from the receiver;
a first calculating module configured to calculate channel gains of the subcarriers according to the coefficient of the channel equalizer;
a first judging module configured to judge whether there exist a second predetermined number of subcarriers of which the channel gains are less than a second threshold value in the first predetermined number of subcarriers; and
a first determining module configured to determine that the cause of degradation of signal to noise ratios comprises a change of the channel gains when it is judged yes by the first judging module.

Supplement 4. The apparatus according to supplement 1, wherein the detecting unit is configured to monitor a discrete multi-tone symbol synchronization error of the system, and determine whether the cause of degradation of signal to noise ratios comprises the discrete multi-tone symbol synchronization error according to a monitoring result.

Supplement 5. The apparatus according to supplement 4, wherein the detecting unit comprises:
a second reading module configured to read a coefficient of the channel equalizer from the receiver;
a second calculating module configured to calculate equalization coefficient phases of the subcarriers according to the coefficient of the channel equalizer, calculate a linear change of the equalization coefficient phases according to the equalization coefficient phases of the subcarriers, and calculate a digital sampling number of the discrete multi-tone symbol synchronization error according to the linear change of the equalization coefficient phases;
a second judging module configured to judge whether the digital sampling number of the discrete multi-tone symbol synchronization error is greater than a third threshold value; and
a second determining module configured to determine that the cause of degradation of signal to noise ratios comprises the discrete multi-tone symbol synchronization error when it is judged yes by the second judging module.

Supplement 6. The apparatus according to supplement 1, wherein the detecting unit is configured to monitor a clock jitter of the system, and determine whether the cause of degradation of signal to noise ratios comprises the clock jitter according to a monitoring result.

Supplement 7. The apparatus according to supplement 6, wherein the detecting unit comprises:
a third reading module configured to read demodulation data of multiple subcarriers from the receiver;
a third calculating module configured to calculate phase noises on the multiple subcarriers according to the demodulation data of the multiple subcarriers, and calculate clock jitters of the multiple subcarriers according to the phase noises on the multiple subcarriers;
a third determining module configured to determine the clock jitter of the system according to the clock jitters of the multiple subcarriers; and
a third judging module configured to judge whether the clock jitter of the system is greater than a fourth threshold value;
and the third determining module determines that the cause of degradation of signal to noise ratios comprises the clock jitter when it is judged yes by the third judging module.

Supplement 8. The apparatus according to supplement 7, wherein the third determining module is configured to:
for subcarriers in each discrete multi-tone symbol, average the clock jitters of the subcarriers in the discrete multi-tone symbol, so as to obtain a clock jitter value on the discrete multi-tone symbol;
and take an average square root value of clock jitter values on multiple discrete multi-tone symbols as the clock jitter of the system.

Supplement 9. The apparatus according to supplement 1, wherein,
the reporting unit reports the degradation of signal to noise ratios and/or channel gains and/or degradation of the channel gains when the cause of degradation of signal to noise ratios comprises a change of the channel gains;
the reporting unit reports the degradation of signal to noise ratios and/or a synchronization error when the cause of degradation of signal to noise ratios comprises the discrete multi-tone symbol synchronization error;
the reporting unit reports the degradation of signal to noise ratios and/or a clock jitter of the system when the cause of degradation of signal to noise ratios comprises the clock jitter;
and the reporting unit reports a system noise and crosstalk when the cause of degradation of signal to noise ratios does not comprise the change of the channel gains, the discrete multi-tone symbol synchronization error and the clock jitter.

Supplement 10. A multicarrier optical communication system, comprising an apparatus for detecting online failure, the apparatus for detecting online failure being configured to:

read signal to noise ratios of subcarriers from a receiver of the system according to a predetermined monitoring time interval;
judge whether there exist a first predetermined number of subcarriers of which the signal to noise ratios are less than a first threshold value;
monitor a change of distortion of the system when it is judged yes, and determine a cause of degradation of signal to noise ratios according to the change of distortion of the system; and
report degradation of signal to noise ratios and/or the cause of degradation of signal to noise ratios.

Supplement 11. A method for detecting online failure, comprising:
reading signal to noise ratios of subcarriers from a receiver of a multicarrier optical communication system according to a predetermined monitoring time interval;
judging whether there exist a first predetermined number of subcarriers of which the signal to noise ratios are less than a first threshold value;
monitoring a change of distortion of the system when it is judged yes, and determining a cause of degradation of signal to noise ratios according to the change of distortion of the system; and
reporting degradation of signal to noise ratios and/or the cause of degradation of signal to noise ratios.

Supplement 12. The method according to supplement 11, wherein the monitoring a change of distortion of the system comprises monitoring a channel gain of the system, the determining a cause of degradation of signal to noise ratios according to the change of distortion of the system comprises:
reading a coefficient of a channel equalizer from the receiver;
calculating channel gains of the subcarriers according to the coefficient of the channel equalizer;
judging whether there exist a second predetermined number of subcarriers of which the channel gains are less than a second threshold value in the first predetermined number of subcarriers; and
determining that the cause of degradation of signal to noise ratios comprises a change of the channel gains when it is judged yes.

Supplement 13. The method according to supplement 11, wherein the monitoring a change of distortion of the system comprises monitoring a discrete multi-tone symbol synchronization error of the system, the determining a cause of degradation of signal to noise ratios according to the change of distortion of the system comprises:
reading a coefficient of the channel equalizer from the receiver;
calculating equalization coefficient phases of the subcarriers according to the coefficient of the channel equalizer;
calculating a linear change of the equalization coefficient phases according to the equalization coefficient phases of the subcarriers;
calculating a digital sampling number of the discrete multi-tone symbol synchronization error according to the linear change of the equalization coefficient phases;
determining that the cause of degradation of signal to noise ratios comprises the discrete multi-tone symbol synchronization error if the digital sampling number of the discrete multi-tone symbol synchronization error is greater than a third threshold value.

Supplement 14. The method according to supplement 11, wherein the monitoring a change of distortion of the system comprises monitoring a clock jitter of the system, the determining a cause of degradation of signal to noise ratios according to the change of distortion of the system comprises:
reading demodulation data of multiple subcarriers from the receiver;
calculating phase noises on the multiple subcarriers according to the demodulation data of the multiple subcarriers;
calculating clock jitters of the multiple subcarriers according to the phase noises on the multiple subcarriers;
determining the clock jitter of the system according to the clock jitters of the multiple subcarriers; and
determining that the cause of degradation of signal to noise ratios comprises the clock jitter if the clock jitter of the system is greater than a fourth threshold value.

Supplement 15. The method according to supplement 14, wherein the determining the clock jitter of the system according to the clock jitters of the multiple subcarriers comprises:
for subcarriers in each discrete multi-tone symbol, averaging the clock jitters of the subcarriers in the discrete multi-tone symbol, so as to obtain a clock jitter value on the discrete multi-tone symbol;
and taking an average square root value of clock jitter values on multiple discrete multi-tone symbols as the clock jitter of the system.

Supplement 16. The method according to supplement 11, wherein,
if the cause of degradation of signal to noise ratios comprises a change of channel gains, the reporting degradation of signal to noise ratios and/or the cause of degradation of signal to noise ratios comprises reporting the degradation of signal to noise ratios and/or the channel gains and/or degradation of the channel gains;
if the cause of degradation of signal to noise ratios comprises a discrete multi-tone symbol synchronization error, the reporting degradation of signal to noise ratios and/or the cause of degradation of signal to noise ratios comprises reporting the degradation of signal to noise ratios and/or the synchronization error;
if the cause of degradation of signal to noise ratios comprises a clock jitter, the reporting degradation of signal to noise ratios and/or the cause of degradation of signal to noise ratios comprises reporting the degradation of signal to noise ratios and/or the clock jitter of the system;
and if the cause of degradation of signal to noise ratios does not comprise the change of the channel gains, the discrete multi-tone symbol synchronization error and the clock jitter, the reporting degradation of signal to noise ratios and/or the cause of degradation of signal to noise ratios comprises reporting a system noise and crosstalk.

Although a few embodiments have been shown and described, it would be appreciated by those skilled in the art that changes may be made in these embodiments without departing from the principles and spirit of the embodiments, the scope of which is defined in the claims and their equivalents.

What is claimed is:
1. An apparatus for detecting online failure, comprising:
a reading unit configured to read signal to noise ratios of subcarriers from a receiver of a multicarrier optical communication system according to a predetermined monitoring time interval;
a judging unit configured to judge whether there exists a first predetermined number of subcarriers of which the signal to noise ratios are less than a first threshold value;

a detecting unit configured to monitor a change of distortion of the system when the judging unit judges yes, and determine a cause of degradation of signal to noise ratios according to a change of distortion in the system; and a reporting unit configured to report one of the degradation of signal to noise ratios and the cause of degradation of signal to noise ratios, wherein the detecting unit is configured to one of:
monitor channel gains of the system when the judging unit judges yes and determine whether the cause of degradation of signal to noise ratios comprises a change of the channel gains according to a monitoring result, and monitor a discrete multi-tone symbol synchronization error of the system when the judging unit judges yes and determine whether the cause of degradation of signal to noise ratios comprises the discrete multi-tone symbol synchronization error according to a monitoring result, and monitor a clock jitter of the system when the judging unit judges yes and determine whether the cause of degradation of signal to noise rations comprises the clock jitter according to a monitoring result.

2. The apparatus according to claim 1, wherein the detecting unit comprises:
a first reading module configured to read a coefficient of a channel equalizer from the receiver;
a first calculating module configured to calculate channel gains of subcarriers according to the coefficient of the channel equalizer;
a first judging module configured to judge whether there exists a second predetermined number of subcarriers of which the channel gains are less than a second threshold value in the first predetermined number of subcarriers; and
a first determining module configured to determine that a cause of degradation of signal to noise ratios comprises a change of the channel gains when judged yes by the first judging module.

3. The apparatus according to claim 1, wherein the detecting unit comprises:
a reading module configured to read a coefficient of the channel equalizer from the receiver;
a calculating module configured to calculate equalization coefficient phases of the subcarriers according to the coefficient of the channel equalizer, calculate a linear change of equalization coefficient phases according to the equalization coefficient phases of the subcarriers, and calculate a digital sampling number of the discrete multi-tone symbol synchronization error according to the linear change of the equalization coefficient phases;
a judging module configured to judge whether the digital sampling number of the discrete multi-tone symbol synchronization error is greater than a third threshold value; and
a determining module configured to determine that the cause of degradation of signal to noise ratios comprises the discrete multi-tone symbol synchronization error when the second judging module judges yes.

4. The apparatus according to claim 1, wherein the detecting unit comprises:
a reading module configured to read demodulation data of multiple subcarriers from the receiver;
a calculating module configured to calculate phase noises of multiple subcarriers according to demodulation data of the multiple subcarriers, and calculate clock jitters of the multiple subcarriers according to phase noises of the multiple subcarriers;
a determining module configured to determine clock jitter of the system according to the clock jitters of the multiple subcarriers; and
a judging module configured to judge whether the clock jitter of the system is greater than a second threshold value; and
wherein the determining module determines that the cause of degradation of signal to noise ratios comprises the clock jitter when the third judging module judges yes.

5. The apparatus according to claim 4, wherein the determining module is configured to:
for subcarriers in each discrete multi-tone symbol, average the clock jitters of the subcarriers in the discrete multi-tone symbol to obtain a clock jitter value of the discrete multi-tone symbol; and
take an average square root value of clock jitter values of multiple discrete multi-tone symbols as the clock jitter of the system.

6. The apparatus according to claim 1, wherein,
the reporting unit reports one of the degradation of signal to noise ratios and channel gains and degradation of channel gains when the cause of degradation of signal to noise ratios comprises a change of the channel gains;
the reporting unit reports the one of the degradation of signal to noise ratios and a synchronization error when the cause of degradation of signal to noise ratios comprises discrete multi-tone symbol synchronization error;
the reporting unit reports the one of the degradation of signal to noise ratios and a clock jitter of the system when the cause of degradation of signal to noise ratios comprises the clock jitter; and
and the reporting unit reports a system noise and crosstalk when the cause of degradation of signal to noise ratios does not comprise the change of the channel gains, the discrete multi-tone symbol synchronization error and the clock jitter.

7. A multicarrier optical communication system, comprising an apparatus for detecting online failure, the apparatus for detecting online failure being configured to:
read signal to noise ratios of subcarriers from a receiver of the system according to a predetermined monitoring time interval;
judge whether there exists a first predetermined number of subcarriers of which the signal to noise ratios are less than a first threshold value;
monitor a change of distortion of the system when judged yes, and determine a cause of degradation of signal to noise ratios according to the change of distortion of the system; and
report one of degradation of signal to noise ratios and the cause of degradation of signal to noise ratios,
wherein the apparatus for detecting online failure is configured to one of:
monitor channel gains of the system when judged yes and determine whether the cause of degradation of signal to noise ratios comprises a change of the channel gains according to a monitoring result, and
monitor a discrete multi-tone symbol synchronization error of the system when judged yes and determine whether the cause of degradation of signal to noise ratios comprises the discrete multi-tone symbol synchronization error according to a monitoring result, and monitor a clock jitter of the system when judged yes and determine whether the cause of degradation of signal to noise ratios comprises the clock jitter according to a monitoring result.

8. A method for detecting online failure, comprising:

reading signal to noise ratios of subcarriers from a receiver of a multicarrier optical communication system according to a predetermined monitoring time interval;

judging whether there exists a first predetermined number of subcarriers of which the signal to noise ratios are less than a first threshold value;

monitoring a change of distortion of the system when judged yes, and determining a cause of degradation of signal to noise ratios according to the change of distortion of the system; and reporting one of degradation of signal to noise ratios and the cause of degradation of signal to noise ratios, wherein the monitoring a change of distortion of the system when judged yes comprises one of:

monitoring channel gains of the system and the determining a cause of degradation of signal to noise ratios according to the change of distortion of the system determining whether the cause of degradation of signal to noise ratios comprises a change of the channel gains according to a monitoring result, and monitoring a change of distortion of the system when judged yes comprises monitoring a discrete multi-tone symbol synchronization error of the system and the determining a cause of degradation of signal to noise ratios according to the change of distortion of the system comprises determining whether the cause of degradation of signal to noise ratios comprises the discrete multi-tone symbol synchronization error according to a monitoring result, and monitoring a change of distortion of the system when judged yes comprises monitoring a clock jitter of the system and the determining a cause of degradation of signal to noise ratios according to the change of distortion of the system comprises determining whether the cause of degradation of signal to noise ratios comprises the clock jitter according to a monitoring result.

9. The method according to claim 8, wherein the determining whether the cause of degradation of signal to noise ratios comprises a change of the channel gains comprises:

reading a coefficient of a channel equalizer from the receiver;

calculating channel gains of the subcarriers according to the coefficient of the channel equalizer;

judging whether there exists a second predetermined number of subcarriers of which the channel gains are less than a second threshold value in the first predetermined number of subcarriers; and determining that the cause of degradation of signal to noise ratios comprises a change of the channel gains when judged yes.

10. The method according to claim 8, wherein the determining whether the cause of degradation of signal to noise ratios comprises the discrete multi-tone symbol synchronization error comprises:

reading the coefficient of the channel equalizer from the receiver;

calculating equalization coefficient phases of the subcarriers according to the coefficient of the channel equalizer;

calculating a linear change of the equalization coefficient phases according to the equalization coefficient phases of the subcarriers;

calculating a digital sampling number of the discrete multi-tone symbol synchronization error according to the linear change of the equalization coefficient phases; and determining that the cause of degradation of signal to noise ratios comprises the discrete multi-tone symbol synchronization error when the digital sampling number of the discrete multi-tone symbol synchronization error is greater than a third threshold value.

11. The method according to claim 8, wherein the determining whether the cause of degradation of signal to noise ratios comprises the clock jitter comprises:

reading demodulation data of multiple subcarriers from the receiver;

calculating phase noises of the multiple subcarriers according to the demodulation data of the multiple subcarriers;

calculating clock jitters of the multiple subcarriers according to the phase noises of the multiple subcarriers;

determining the clock jitter of the system according to the clock jitters of the multiple subcarriers; and determining that the cause of degradation of signal to noise ratios comprises the clock jitter when the clock jitter of the system is greater than a fourth threshold value.

12. The method according to claim 11, wherein the determining the clock jitter of the system according to the clock jitters of the multiple subcarriers comprises:

for subcarriers in each discrete multi-tone symbol, averaging the clock jitters of the subcarriers in the discrete multi-tone symbol to obtain a clock jitter value of the discrete multi-tone symbol; and taking an average square root value of clock jitter values of multiple discrete multi-tone symbols as the clock jitter of the system.

13. The method according to claim 8, wherein, when the cause of degradation of signal to noise ratios comprises a change of channel gains, the reporting the one of the degradation of signal to noise ratios and the cause of degradation of signal to noise ratios comprises reporting the one of the degradation of signal to noise ratios and the channel gains and degradation of the channel gains;

when the cause of degradation of signal to noise ratios comprises a discrete multi-tone symbol synchronization error, the one of the reporting degradation of signal to noise ratios and the cause of degradation of signal to noise ratios comprises reporting the one of the degradation of signal to noise ratios and the synchronization error;

when the cause of degradation of signal to noise ratios comprises a clock jitter, the one of the reporting degradation of signal to noise ratios and the cause of degradation of signal to noise ratios comprises reporting the one of the degradation of signal to noise ratios and the clock jitter of the system; and when the cause of degradation of signal to noise ratios does not comprise the change of the channel gains, the discrete multi-tone symbol synchronization error and the clock jitter, the reporting the one of the degradation of signal to noise ratios and the cause of degradation of signal to noise ratios comprises reporting system noise and crosstalk.

14. A non-transitory computer readable storage medium storing a method for detecting online failure, the method comprising:

reading signal to noise ratios of subcarriers from a receiver of a multicarrier optical communication system according to a predetermined monitoring time interval;

judging whether there exists a first predetermined number of subcarriers of which the signal to noise ratios are less than a first threshold value;

monitoring a change of distortion of the system when judged yes, and determining a cause of degradation of signal to noise ratios according to the change of distortion of the system; and reporting one of degradation of signal to noise ratios and the cause of degradation of signal to noise ratios, wherein the monitoring a change of distortion of the system when judged yes comprises one of:

monitoring channel gains of the system and the determining a cause of degradation of signal to noise ratios according to the change of distortion of the system comprises determining whether the cause of degradation of signal to noise ratios comprises a change of the channel gains according to a monitoring result, and monitoring a change of distortion of the system when judged yes comprises monitoring a discrete multi-tone symbol synchronization error of the system and the determining a cause of degradation of signal to noise ratios according to the change of distortion of the system comprises determining whether the cause of degradation of signal to noise ratios comprises the discrete multi-tone symbol synchronization error according to a monitoring result, and monitoring a change of distortion of the system when judged yes comprises monitoring a clock jitter of the system and the determining a cause of degradation of signal to noise ratios according to the change of distortion of the system comprises determining whether the cause of degradation of signal to noise ratios comprises the clock jitter according to a monitoring result.

\* \* \* \* \*